Nov. 14, 1933.    R. C. MAGEE    1,934,986
SINTERING MACHINE CONTROL
Filed Aug. 15, 1932    5 Sheets-Sheet 1

Inventor
Raymond C. Magee

Nov. 14, 1933.   R. C. MAGEE   1,934,986
SINTERING MACHINE CONTROL
Filed Aug. 15, 1932   5 Sheets-Sheet 2

Inventor:
Raymond C. Magee
By Brown, Jackson, Boettcher & Dienner, Attys.

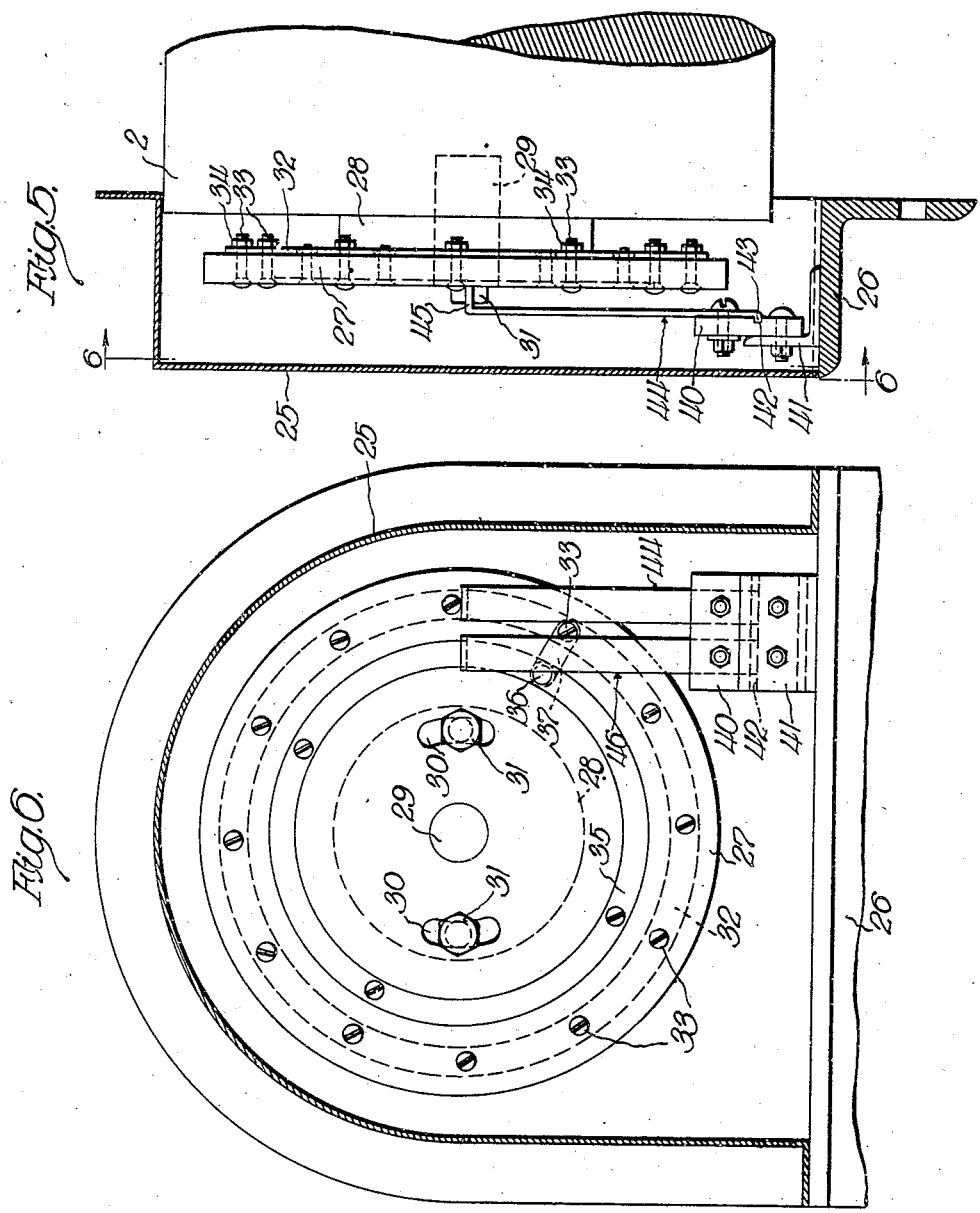

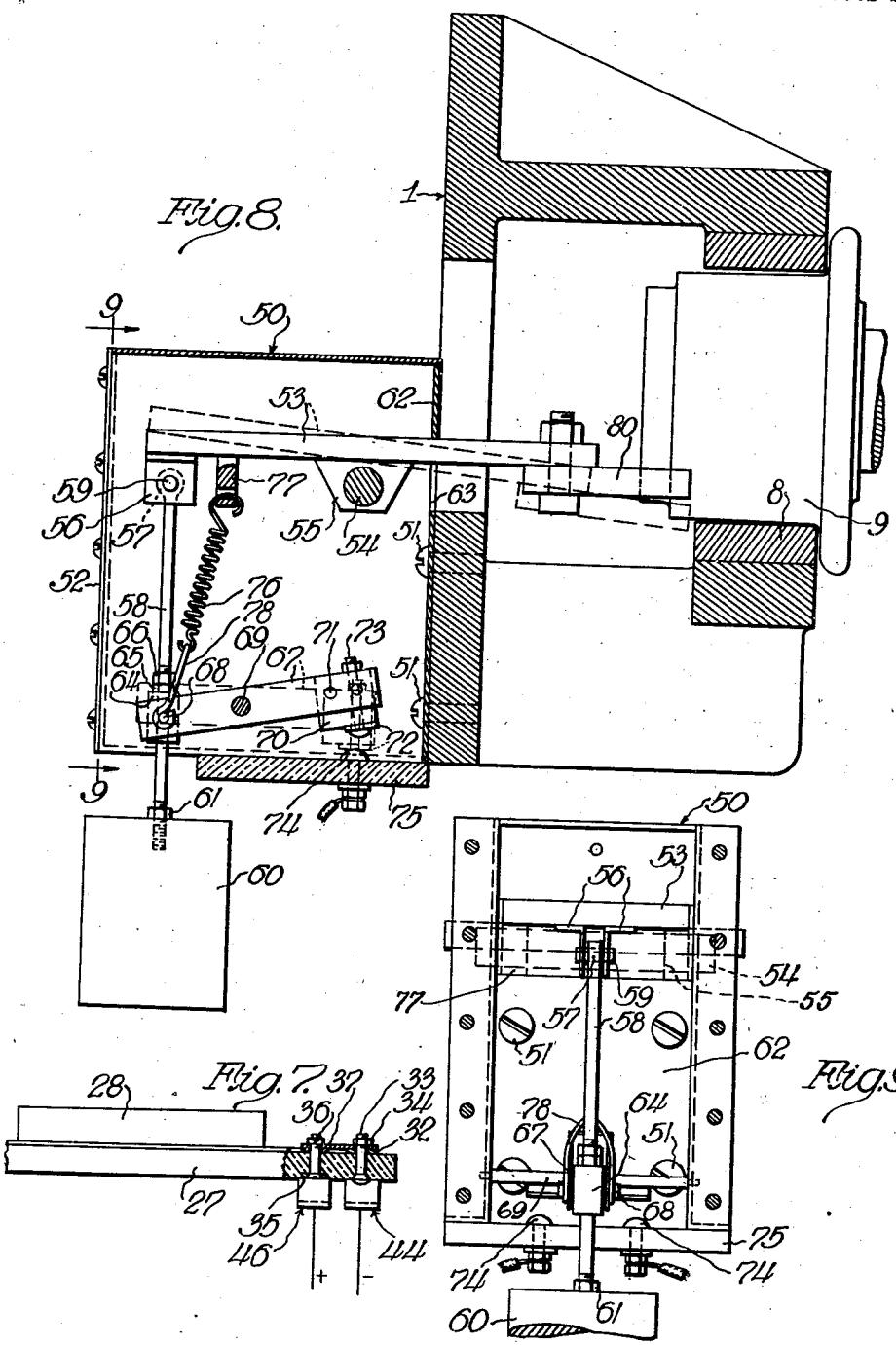

Nov. 14, 1933.  R. C. MAGEE  1,934,986
SINTERING MACHINE CONTROL
Filed Aug. 15, 1932    5 Sheets-Sheet 5

Inventor:
Raymond C. Magee
By Brown, Jackson, Boettcher & Dienner
Attys.

Patented Nov. 14, 1933

1,934,986

UNITED STATES PATENT OFFICE 1,934,986

SINTERING MACHINE CONTROL

Raymond C. Magee, Buffalo, N. Y., assignor to American Ore Reclamation Company, Chicago, Ill., a corporation of New York Application August 15, 1932. Serial No. 628,803

14 Claims. (Cl. 266—21)

This invention relates to sintering machines, and has to do with means for controlling the operation thereof.

In sintering machines of the Dwight & Lloyd type, pallets are propelled in a train along a track comprising an upper run and a lower run, the sintered material being discharged from the pallets at the delivery end of the machine. The pallets travel along the lower run of the track in a continuous train and in endwise contact, to sprocket wheels at the receiving or feed end of the machine. The lower run is commonly provided with an incline by means of which the pallets are delivered by gravity into predetermined position on the lower run, relative to the sprocket wheels. These wheels are provided with suitably disposed teeth which enter pockets in the pallets and act, in the travel of the wheels, to elevate the pallets and return them to the upper run of the track. In the discharge of the sinter at the delivery end, a gap is formed in the train of pallets and the sintered material is broken off, as the successive pallets enter the return bend at the delivery end, this breaking of the sinter resulting in small particles thereof being loosened. In the operation of the machine, some of the particles of the sintered material adhere to the wheels of the pallets and, in some instances, small amounts of the material to be sintered drop onto the lower run of the track.

In the normal operation of the machine, the pallets travel along the lower run of the track and are successively delivered into position to receive the teeth of the sprocket wheels. However, it frequently happens that, due to the collection of sintered material on the lower run of the track and other causes, the leading pallet on the lower run will stick in such a position that it is in the path of travel of the teeth of the sprocket wheels, but is not sufficiently advanced for the teeth to enter the pockets of the pallet. Under such conditions, the sprocket wheel teeth will strike the pallet frame with disastrous results. Usually, the pallet is broken, though there is always the possibility that the teeth of the sprocket wheels will be broken or the machine will be wrecked. The breaking of a pallet is objectionable as causing considerable delay in the operation of the machine, aside from the cost of replacing the pallet. Breaking of the teeth of the sprocket wheels or wrecking of the machine is, of course, much more serious than breaking a pallet. This sticking of the pallet in position to be struck by the teeth of the sprocket wheels is a serious problem in the operation of these machines and, so far as I am aware, has not heretofore been solved in a satisfactory manner.

The primary object of my invention is to provide simple and efficient control means for automatically stopping the operation of a sintering machine when a pallet is so positioned as to be struck by the teeth of the sprocket wheel with resulting damage to the pallet or to the machine. A further object is to provide control means of the character stated which can be applied to a sintering machine of ordinary construction without necessitating any material changes therein. Further objects and advantages of my invention will appear from the detail description.

In the drawings:—

Figure 5 is a section taken substantially on line 5—5 of Figure 3, on an enlarged scale, parts being shown in elevation;

Figure 6 is a section taken substantially on line 6—6 of Figure 5;

Figure 7 is a fragmentary plan view of the sprocket wheel switch, partly broken away and in section;

Figure 8 is a section taken substantially on line 8—8 of Figure 3, on an enlarged scale;

Figure 9 is an outer side view of the track switch with the cover plate removed, taken substantially on line 9—9 of Figure 8;

Figure 1:
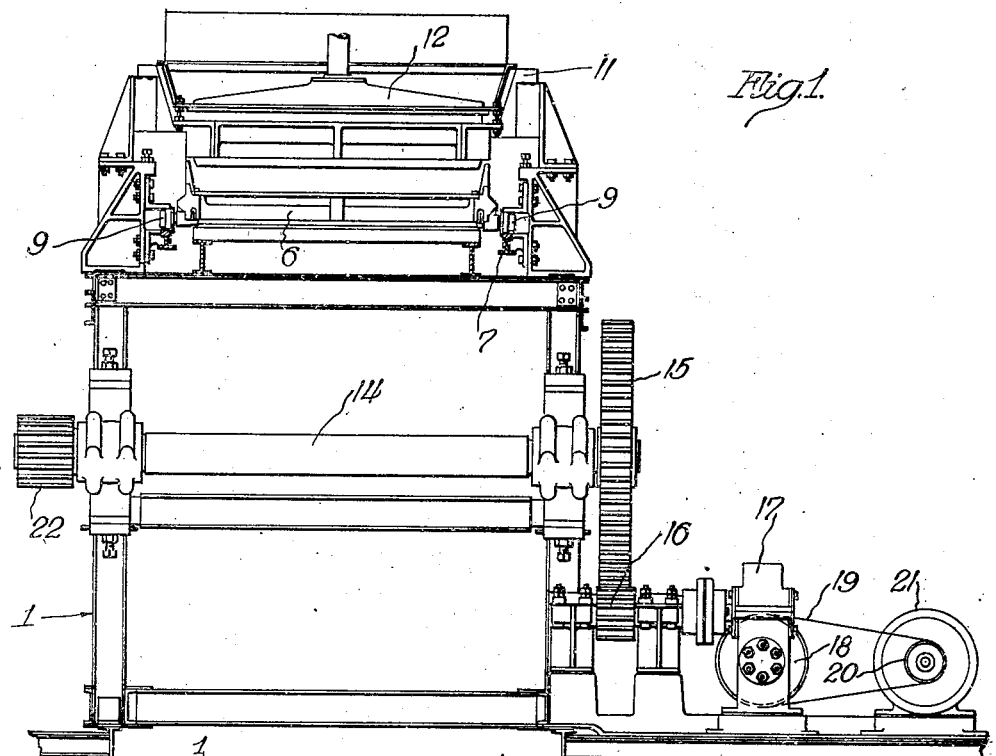
Figure 1 is a transverse vertical sectional view through a sintering machine to which my invention is applicable, this view being taken substantially on line 1—1 of Figure 2, parts being omitted for clearness.

I have illustrated my invention as applied to a sintering machine of known type. This machine comprises a frame 1 at the return end of which is mounted a transverse sprocket shaft 2 upon which is mounted a pair of sprocket wheels, one sprocket wheel 3 being disposed adjacent each side of the frame. Each of the wheels 3 is provided with a plurality of teeth 4 which engage into pockets 5 provided in pallets 6 which travel upon upper and lower runs 7 and 8, respectively, of an endless track supported by the frame. The pallets are of known type and are provided with wheels 9 which travel upon the track, the pockets 5 being disposed between the wheels of the respective pallets. Sprocket wheels 3 rotate with the shaft 2 and move the pallets 6 upwardly about a return bend 10 so as to deliver them to the upper run of the track, along which the pallets are propelled, by the sprocket wheels, in endwise contact.

Figure 2:
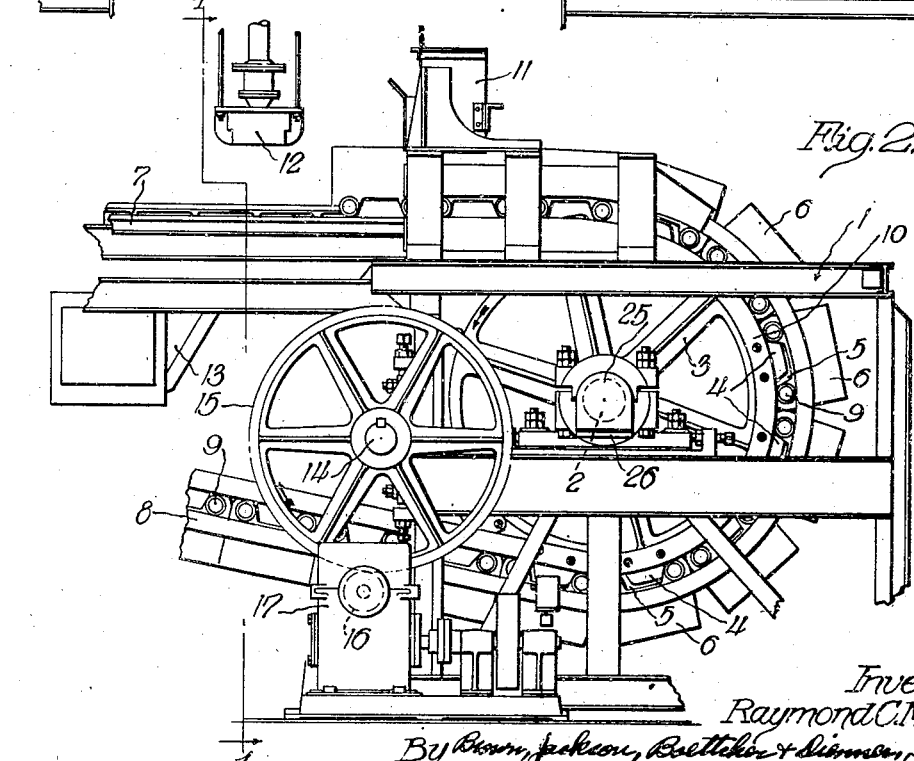
Figure 2 is a fragmentary side view of the feed end of the machine.

The pallets pass beneath a hopper 11 to which the material to be sintered is delivered in a suitable manner, usually by a swinging spout, and the loaded pallets then pass beneath an ignition device 12. The hopper and the ignition device and associated parts are of known construction and need not be illustrated nor described in detail. From the ignition device the pallets pass over a plurality of wind boxes, one of which is shown at 13, so as to create a downdraft through the material on the pallets for sintering this material in a known manner. At the delivery end of the machine, the pallets pass about a return bend so as to discharge the sinter, and then travel along the lower run 8 of the track in a train and in endwise contact, the pallets moving along the lower run successively into position to be engaged by the teeth of the sprocket wheels. The portion of the lower run of the track adjacent the sprocket wheels may be inclined downwardly toward the latter as shown in Figure 2, for delivering the pallets by gravity into position to be engaged by the teeth of the sprocket wheels, or the pallets may be propelled along the lower run of the track in any other suitable or preferred manner.

A countershaft 14 is rotatably mounted on the frame in advance of and parallel to shaft 2. A spur gear 15 is secured upon one end of the shaft 14 and meshes with a pinion 16 driven from a speed reducing unit 17 of known type. This unit 17 comprises a pulley 18 driven by a belt 19 from a pulley 20 secured on the shaft of an electric motor 21. A spur pinion 22 is secured on the other end of shaft 14 and meshes with a spur gear (not shown) secured on the corresponding end of shaft 2. This provides means for driving the sprocket wheel shaft from the motor 21 and at proper speed. The means shown for driving shaft 2 is of known type and need not be illustrated nor described in greater detail, it sufficing that any suitable means may be provided for driving the sprocket wheel shaft, such means preferably comprising an electric motor.

Figure 3:
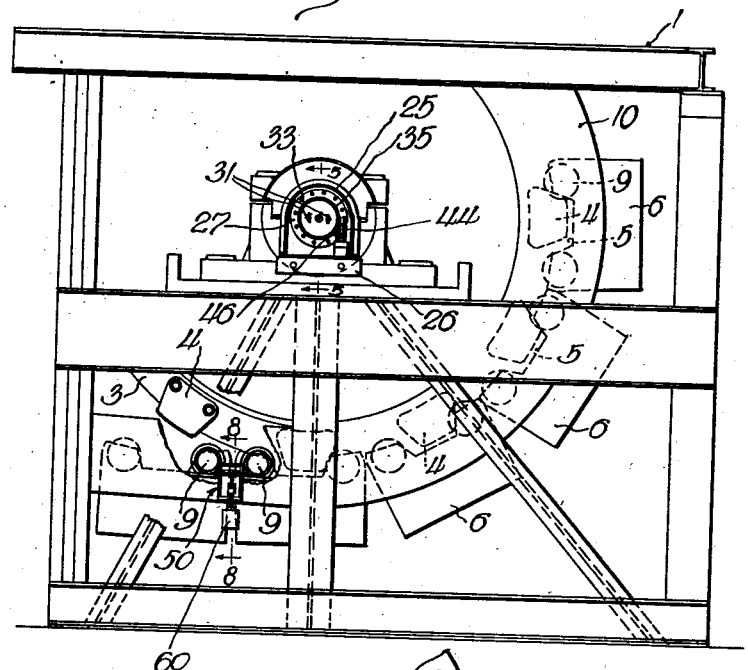
Figure 3 is a fragmentary side view, on an enlarged scale, of the feed end of the machine with control means in accordance with my invention applied, parts being omitted for clearness.

When the leading pallet of the train on the lower run of the track is in proper position relative to the sprocket wheels, the teeth 4 of these wheels will enter the pockets 5 in the pallet frame at each side thereof, as in Figure 3, for elevating the pallet and returning it along the return bend to the upper run of the track. If this leading pallet is not in proper position for the teeth of the sprocket wheels to enter the pockets, but is in position to be struck by the teeth of the sprocket wheels, either the pallet will be broken or serious damage will be caused to the machine. To avoid this, I provide control means for stopping the machine when the leading pallet on the lower run is improperly positioned with relation to the sprocket wheels and in the path of travel of the teeth thereof.

A suitable housing 25, which may be formed of sheet metal, is suitably secured to an angle bracket 26 which is secured to frame 1 of the machine below and adjacent one end of sprocket wheel shaft 2. This housing encloses a switch comprising a disc 27 of fiber or other suitable electrical insulating material, from the inner face of which extends a spacing member 28. The disc and member 28 are centrally bored for reception of a stud 29 which extends into the end of shaft 2 centrally thereof. Disc 27 is thus mounted on shaft 2 coaxially therewith. Two slots 30 extend through disc 27 and member 28 concentrically with stud 29. These slots receive cap screws 31 which screw into the end of shaft 2, the heads of these screws bearing against the outer face of disc 27. This provides means for so securing the disc to the shaft as to permit of an initial adjustment of the disc on the axis of stud 29.

A ring 32 of brass or other suitable electrical conducting material is mounted at the inner side of disc 27 concentric therewith. Ring 32 is secured to the disc by means of screws 33 passing therethrough and through the ring, nuts 34 being threaded onto the inner ends of these screws and bearing against the ring. A contact ring 35, also of brass or other suitable electrical conducting material, is set into the outer face of disc 27 concentric therewith and with ring 32. Ring 35 is secured to the disc in the same manner as ring 32, by means of screws 36 and associated nuts. An electrical connection is established between the rings 32 and 35 by means of a conductor strip 37 through which one of the screws 33 passes at one end thereof, which seats against strip 32, one of the screws 36 passing through the strip 37 at the other end thereof which may be slightly thickened as in Figure 7. The outer or head ends of the screws 33 are conveniently rounded slightly and provide spaced contacts, these contacts corresponding in number to the teeth of the respective sprocket wheels.

A block 40 of fiber or other suitable electrical insulating material is bolted or otherwise suitably secured to a bracket 41, which, in turn, is suitably secured to bracket 26. The block 40 is provided in its inner face with a transversely extending groove 42. This groove receives a short finger 43 bent outwardly from the lower end of a brush 44 in the form of a leaf spring, which brush is bolted or otherwise suitably secured to block 40. At its upper end brush 44 is bent at right angles to provide a finger 45 disposed to contact the heads of screws 33 in the rotation of disc 27 with shaft 2. A second brush 46 similar to brush 44 is mounted upon block 40 in the same manner as brush 44, brush 46 being disposed to contact ring 35. In the rotation of disc 27, brush 44 makes intermittent contact with the heads of the screws 33 and brush 46 is in continuous contact with the strip 35. The disc 27 and brushes 44 and 46 constitute a sprocket switch which cooperates with a track switch in a manner to be described.

A housing 50 of box-like construction is suitably secured to frame 1, as by means of screws 51 passing through the inner side wall of the housing and screwing into the frame. The outer side of the housing is closed by a removable cover plate 52 for ready access to the interior of the housing. A lever 53 is pivotally mounted intermediate its ends, on a pin 54 extending from front to back of housing 50 and through a lug 55 depending from lever 53, the ends of this pin extending through the front and the back walls of the housing. A pair of brackets 56 are secured to the under face of the outer end of lever 53 and receive between them an eye 57 at the upper end of a rod 58, this eye receiving a pin 59 which passes through the brackets 56 and pivotally connects the upper end of the rod thereto. A weight 60 screws onto the lower end of rod 58 and is held against rotation relative thereto by a jam nut 61. The weight 60 provides, in connection with the rod 58 and associated parts, yielding means for holding the outer end of lever 53 depressed so as to normally hold the lever, at a point thereof inwardly beyond pin 54, adjacent inner wall 62 of housing 50 at the top of an opening 63 provided through this wall to accommodate the lever.

A sleeve 64 is slidably mounted on rod 58, upward movement of this sleeve on the rod being limited by an abutment 65 in the form of a nut screwing onto the rod, this nut 65 being held in adjustment by a cooperating jam nut 66. A switch arm 67, of elongated U-shape in plan, is pivotally mounted at its outer end upon pins 68 which project from sleeve 64 at diametrically opposite points thereof and extend through the lateral elements of arm 67. This arm 67 is pivoted intermediate its ends on a pin 69 which extends therethrough, the ends of this pin extending through the front and the back walls of housing 50.

A block 70 of fiber or other suitable electrical insulating material is secured by a pin 71 in a switch arm 67 at the inner end thereof. A contact strip 72 of brass or other suitable conducting material is secured by means of a screw 73 to the under face of block 70 and projects beyond the sides of the block. This strip 72 is disposed to contact the heads of two screws 74 carried by a plate of insulating material 75 suitably secured to the lower end of housing 50, when arm 67 is moved into closed position. A tension spring 76 is attached at its upper end to a bar 77 extending across the housing and suitably secured to the walls thereof, the lower end of this spring engaging through a bail 78, the ends of which are hooked over pins 68. This spring normally holds sleeve 64 in contact with the abutment member or nut 65 and also serves, when the inner end of switch arm 67 is in lowered or closed position, to hold contact strip 72 in contact with the screws 74 if the outer end of lever 53 is raised sufficiently to move rod 58 upwardly through sleeve 64. In this manner I accommodate variations in the extent of movement of lever 53 in switch closing direction while assuring proper contact between strip 72 and the screws 74.

A trip plate 80 is bolted or otherwise suitably secured to the inner end of lever 53. This plate is of less length than the distance between the front and the back wheels of a pallet, and of greater length than the distance between the back wheel of a pallet and the front wheel of the next adjacent pallet in endwise contact therewith. Plate 80 is arranged in the path of travel of the wheels of the pallets moving along the lower run 8 of the track, and is so disposed as to be between the front and the back wheels of the leading pallet of the train of pallets on the lower run, when this leading pallet is properly positioned to receive in the pockets thereof the teeth of the sprocket wheels. The disposition of plate 80 is also such that if the leading pallet on the lower run is not sufficiently advanced to receive in the pockets thereof the teeth of the sprocket wheels, the front wheels of this leading pallet will remain upon the plate and will hold it depressed, if the pallet is in such a position as to be struck by the teeth of the sprocket wheels.

Figure 4:
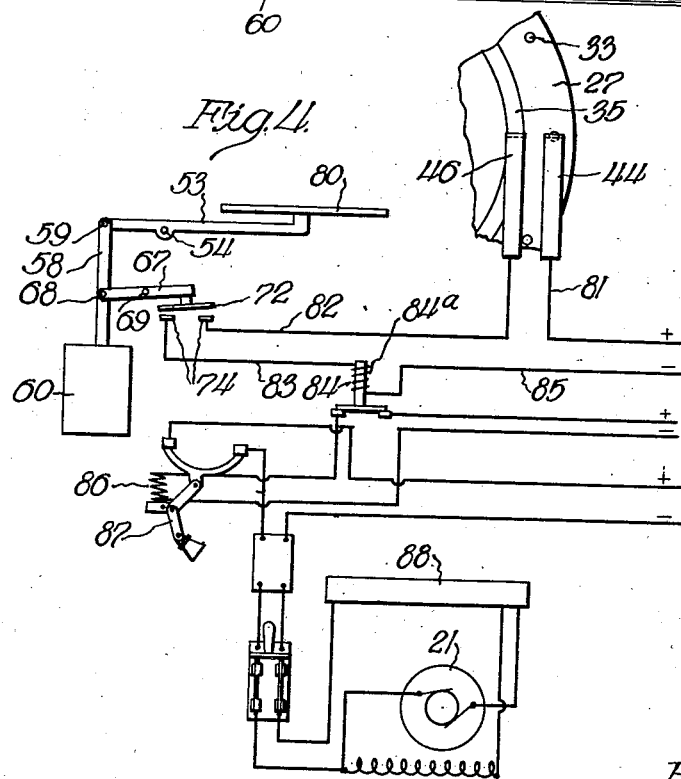
Figure 4 is a diagram of the control circuit and the motor circuit and associated parts.

In Figure 4 I have illustrated diagrammatically the switch and the motor circuits and associated parts for controlling the operation of the machine. A lead 81 connects brush 44 to one side of a suitable source of electrical energy. A lead 82 connects brush 46 to one of the screws 74 of the track switch. The other screw 74 is connected by a lead 83 to one terminal of a coil 84a of a relay 84 of conventional type, the other terminal of coil 84a being connected by a lead 85 to the other side of the source of electrical energy. Relay 84 controls the circuit of a coil 86 of a circuit breaker 87 of known type interposed in the circuit of motor 21, with which is associated a controller 88 of known type. Normally, the circuit of coil 84a is open with the relay 84 closed, so that coil 86 is energized and maintains circuit breaker 87 closed, thus closing the motor circuit which is then controlled by the controller 88. When the circuit of coil 84a is closed, the relay is opened, thus deenergizing coil 86 and causing opening of the circuit breaker 87. This opens the circuit of motor 21 and stops the operation of the machine.

The screws 33 of disc 27 are disposed in approximate alignment radially of the disc with the teeth of the adjacent sprocket wheel 3. Brush 44 is so disposed, and the screws 33 are so spaced, that this brush contacts one of the screws immediately after the leading pallet on the lower run has moved into proper position for engagement with the sprocket wheel, and remains out of contact with any of the screws 33 during travel of the back wheel of this leading pallet and the front wheel of the next adjacent pallet over the trip plate. In this manner, the sprocket switch and the track switch are alternately closed and opened in opposite relation so that, in the normal operation of the machine, these two switches are not both closed at the same time. Since these switches are connected in series, as in Figure 4, the circuit of coil 84a of the relay remains open in the normal operation of the machine and the circuit breaker 87 in the motor circuit remains closed.

Figure 10:
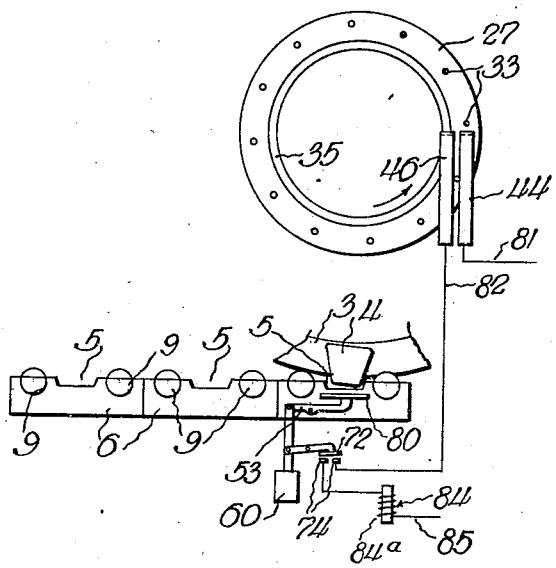
Figures 10 and 11 are diagrams illustrating the successive steps in the normal operation of the control means.

In Figure 10 the leading pallet on the lower run is in proper position to receive the sprocket tooth 4 of the sprocket wheel, this tooth being shown as entering pocket 5 of the pallet. When the pallet is so positioned, trip plate 80 is disposed between the front and the back wheel of the pallet and lever 53 is held in the position of Figure 8, by the weight 60, thus holding the track switch open. Just before the leading pallet reaches this position, one of the screws 33 passes beneath brush 44 in contact therewith, this screw being shown in Figure 10 as advanced slightly beyond brush 44, it being noted that the disc 27 is rotated in a counterclockwise direction as viewed in this figure.

Figure 11:
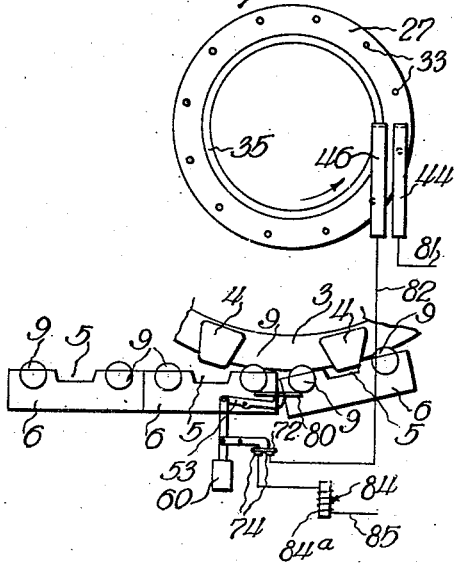

In Figure 11 the first pallet has been advanced by the sprocket wheel and the succeeding tooth of the sprocket wheel is moving downwardly into position to engage into the pocket of the next pallet, which is now the leading pallet on the lower run of the track. At this time the trip plate is held depressed by the back wheel of the first pallet and the front wheel of the leading pallet and the sprocket switch is opened, since the next succeeding screw thereof has not been advanced sufficiently to contact the brush 44. After the back wheel of the first pallet passes off of the trip plate, and immediately after the front wheel of the leading pallet passes off of this plate, the succeeding screw 33 of the sprocket switch contacts brush 44, but the circuit of relay coil 84a remains open since the track switch is now open, the trip plate being raised between the front and the back wheel of the leading pallet which is now in position to receive in the pocket thereof the next tooth of the sprocket wheel. In this manner the sprocket switch and the track switch are normally closed and opened in opposite and alternate relation, the operation of these switches being so timed relative to the travel of the pallets on the lower run of the track as to assure that the circuit of the relay coil 84a remains open so long as the successive pallets are moved into proper position for cooperation with the teeth of the sprocket wheels.

Figure 12:
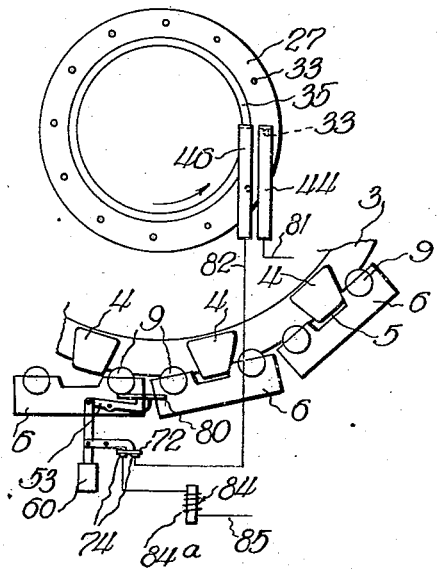
Figure 12 is a diagram illustrating the operation of the control means when a pallet is stuck on the lower run of the track in position to be struck by the teeth of the sprocket wheels.

If the leading pallet on the lower run should stick in such position as to be struck by the teeth of the sprocket wheel, while being out of position for receiving the teeth in the pockets of the pallet, the motor circuit will be opened and operation of the machine stopped. This condition is illustrated in Figure 12, in which the first and the second pallets have been advanced by the sprocket wheels and the third pallet, which is now the leading pallet on the lower run, is stuck with the front wheel thereof holding down the trip plate so that the track switch is closed. This leading pallet is disposed to be struck by the tooth 4 of the sprocket wheel, but is not sufficiently advanced to receive this tooth in pocket 5. Before tooth 4 of the sprocket wheel is advanced sufficiently to strike the pallet, screw 33 of disc 27 contacts brush 44. Since the track switch is now closed, this closing of the sprocket switch closes the circuit of coil 84a of relay 84, which immediately operates to open the circuit of coil 86 of the circuit breaker 87, which latter immediately opens, thus opening the motor circuit and stopping operation of the machine before the sprocket tooth strikes the improperly positioned pallet. This avoids breakage of the pallet or possible serious damage to the machine. With the motor stopped, the leading pallet can be advanced into proper position, it being understood that the entire train of pallets on the lower run of the track is also advanced correspondingly.

Figure 13:
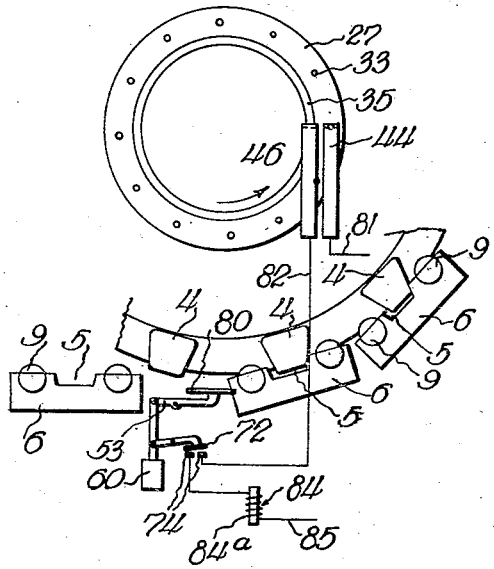
Figure 13 is a diagram illustrating the operation of the control means when the leading pallet on the lower run of the track is stuck in a position to clear the teeth of the sprocket wheels.

If the leading pallet on the lower run of the track sticks in advance of the trip plate, in which position it will be disposed out of the path of travel of the teeth of the sprocket wheel, and remains in this position, there is no necessity for immediately stopping the operation of the machine, since the pallet is not in such a position as to be damaged, or to cause possible damage to the machine. This is illustrated in Figure 13, in which the leading pallet is shown in advance of the trip plate. Since the track switch remains open, the circuit of relay coil 84a remains open and operation of the machine continues. The train of pallets on the lower run may now be advanced so as to bring the leading pallet into proper position to receive in the pockets thereof the sprocket wheel teeth, the operation of the machine being stopped during this advancement of the train of pallets if desired. Thereafter the operation of the machine is continued in the manner above described.

In the case of the leading pallet being stuck on the track beyond the trip plate, it is possible that this leading pallet may be struck by the next following pallet and advanced into position on the trip plate and with its leading end in contact with the circumferential face of the corresponding sprocket tooth. Under such conditions it is desirable that the machine be stopped in order that the pallets delivered to the upper run of the track may be in endwise contact with no space therebetween, even though there may be no danger of breaking the pallet or injuring the machine. Since the pallet, thus positioned, holds the track switch closed, the machine will be stopped promptly in the same manner as when the leading pallet is in position to be struck by the sprocket tooth. This permits of the leading pallet being advanced into proper position, after which the machine is again set into operation.

While my invention is particularly adapted for use in sintering machines of the character disclosed, it is also well suited, in its broader aspects, for use with machines of various types in which members traveling on a track or equivalent structure are to be transferred from one portion thereof to another portion by means of sprocket wheels or other transfer mechanism. Preferably, I employ an electric motor for driving the machine, although this is not essential in all cases and, in its broader aspects, my invention comprehends any suitable or preferred means for driving the machine, in combination with means for automatically disabling the driving means when the members to be transferred are improperly positioned relative to the means for effecting transfer of said members.

What I claim is:—

1. In combination, a sintering machine comprising an endless track having an upper run and a lower run, a train of pallets traveling on said track, means for engaging the pallets on the lower run of the track and raising them to the upper run, the pallets on the lower run being movable into predetermined position thereon for engagement by said means, and means for automatically disabling said pallet engaging and raising means when a pallet on the lower run is improperly positioned relative to the engaging and raising means.

2. In combination, a sintering machine comprising a track, a train of pallets traveling on the track, means for engaging the pallets on one portion of the track and transferring them to a second portion thereof, the pallets on said one portion being movable into predetermined position thereon for engagement by said means, and means for automatically disabling said engaging and transferring means when the first pallet adjacent thereto on said one portion of the track is improperly positioned relative to the engaging and transferring means.

3. In combination, a track, a plurality of members traveling on the track, means for engaging the members on one portion of the track and transferring them to a second portion thereof, the members on said one portion being movable into predetermined position thereon for engagement by said means, and means controlled by travel of said members for automatically disabling said engaging and transferring means when the first member adjacent thereto on said one portion of the track is improperly positioned relative to the engaging and transferring means.

4. In combination, a track, a plurality of members traveling on the track, means for transferring the members from one portion of the track to a second portion thereof, said means and said members having cooperating elements disposed for interengagement when the first member adjacent the transfer means and on said one portion of the track is in predetermined operative relation to the transfer means, and means for automatically disabling the transfer means when said first member is out of said position but in position to be struck by said elements of the transfer means.

5. In combination, a sintering machine comprising an endless track having an upper run and a lower run, a train of pallets traveling on said track, sprocket wheels at one end of the track for engaging the pallets on the lower run and returning them to the upper run, means for driving the sprocket wheels, the pallets being movable along the lower run into predetermined position thereon for engagement by the teeth of the sprocket wheels, and means for automatically disabling the driving means when a pallet on the lower run is disposed out of said position but in position to be struck by the teeth of the sprocket wheels.

6. In combination, a sintering machine comprising an endless track having an upper run and a lower run, a train of pallets traveling on said track, sprocket wheels at one end of the track for engaging the pallets on the lower run and returning them to the upper run, means for driving the sprocket wheels, the pallets being movable along the lower run into predetermined position thereon for engagement by the teeth of the sprocket wheels, and means for automatically disabling the driving means when the pallet on the lower run first adjacent the sprocket wheels is disposed out of said position but in position to be struck by the teeth of the sprocket wheels, said disabling means being ineffective when said pallet is disposed away from the sprocket wheels and out of the path of travel of the teeth thereof.

7. In combination, a sintering machine comprising an endless track having an upper run and a lower run, a train of pallets traveling on said track, sprocket wheels at one end of the track for engaging the pallets on the lower run and returning them to the upper run, means for driving the sprocket wheels, the pallets being movable along the lower run into predetermined position thereon for engagement by the teeth of the sprocket wheels, and means controlled by travel of the pallets on the lower run for automatically disabling the driving means when a pallet on the lower run is disposed out of said position but in position to be struck by the teeth of the sprocket wheels.

8. In combination, a sintering machine comprising an endless track having an upper run and a lower run, a train of pallets traveling on said track, sprocket wheels at one end of the track for engaging the pallets on the lower run and returning them to the upper run, means for driving the sprocket wheels, the pallets being movable along the lower run into predetermined position thereon for engagement by the teeth of the sprocket wheels, and means controlled by travel of the pallets on the lower run for automatically disabling the driving means when the pallet on the lower run first adjacent the sprocket wheels is disposed out of said position but in position to be struck by the teeth of the sprocket wheels, said disabling means being ineffective when said pallet is disposed away from the sprocket wheels and out of the path of travel of the teeth thereof.

9. In combination in a sintering machine, an endless track having an upper run and a lower run, a train of pallets traveling on said track, sprocket wheels at one end of the track for engaging the pallets on the lower run and returning them to the upper run, the pallets on the lower run being normally in endwise contact one with the other and said pallets having pockets for reception of the teeth of the sprocket wheels, the pallets being movable along the lower run into predetermined position to receive in said pockets the sprocket wheel teeth, means for driving the sprocket wheels, and means for automatically disabling the driving means when a pallet on the lower run is in the path of travel of the sprocket wheel teeth and out of said predetermined position.

10. In combination in a sintering machine, an endless track having an upper run and a lower run, a train of pallets traveling on said track, sprocket wheels at one end of the track for engaging the pallets on the lower run and returning them to the upper run, the pallets on the lower run being movable therealong into predetermined position for engagement by the sprocket wheel teeth, means comprising an electric motor for driving the sprocket wheels, a switch intermittently closed and opened in the operation of the sprocket wheels, a second switch intermittently closed and opened in the travel of the pallets on the lower run, the two switches being so timed that when one is closed the other is open and vice versa in the normal travel of the pallets on said lower run, the second switch remaining closed when a pallet on the lower run is out of said predetermined position and in the path of travel of the sprocket wheel teeth, and means effective when both of said switches are closed for opening the motor circuit.

11. In combination in a sintering machine, an endless track having an upper run and a lower run, a train of pallets traveling on said track, sprocket wheels at one end of the track for engaging the pallets on the lower run and returning them to the upper run, the pallets on the lower run being normally in endwise contact one with the other and movable along the lower run into predetermined position for engagement by the sprocket wheel teeth, means comprising an electric motor for driving the sprocket wheels, a sprocket switch intermittently closed and opened in accordance with travel of the sprocket wheel teeth into and out of position to engage the pallets, a track switch, a trip plate on the lower run connected to the track switch for closing the latter upon depression of the plate, said plate being disposed to be depressed by the pallet wheels and to be between the wheels of a pallet in said predetermined position, the length of the plate being less than the distance between the wheels of a pallet and greater than the distances between the adjacent wheels of two adjacent pallets, yielding means for opening the track switch and raising the trip plate, the sprocket switch being timed to open when the track switch is closed and vice versa in the normal travel of the pallets on the lower run, and means for opening the motor circuit when both of said switches are closed.

12. In combination in a sintering machine, an endless track having an upper run and a lower run, a train of pallets traveling on said track, sprocket wheels at one end of the track for engaging the pallets on the lower run and returning them to the upper run, the pallets on the lower run being normally in endwise contact one with the other and movable along the lower run into predetermined position for engagement by the sprocket wheel teeth, means comprising an electric motor for driving the sprocket wheels, a sprocket switch comprising a member connected to the sprocket wheels for rotation therewith and provided with contacts corresponding in number to the teeth of the respective wheels, a track switch, a trip plate on the lower run connected to the track switch for closing the latter upon depression of the plate, said plate being disposed to be depressed by the pallet wheels and to be between the wheels of a pallet in said predetermined position, the length of the plate being less than the distance between the wheels of a pallet and greater than the distance between the adjacent wheels of two adjacent pallets, yielding means for opening the track switch and raising the trip plate, said contacts being disposed to close the sprocket switch when the track switch is open and vice versa in the normal travel of the pallets on the lower run, and means for opening the motor circuit when both of said switches are closed.

13. In combination, a track, a plurality of members traveling on the track, means for transferring said members from one portion of the track to another portion thereof, means comprising an electric motor for driving the transfer means, said transfer means having projections for engaging said members and the latter being movable along said one portion of the track into predetermined position for engagement by said projections, a switch intermittently closed and opened in the operation of the transfer means, a second switch intermittently closed and opened in the travel of the members on said one portion of the track, said switches being operated in opposite relation in the normal travel of the members and said second switch remaining closed when one of said members is out of said predetermined position and in the path of travel of the projections of the transfer means, and means for opening the motor circuit when both of said switches are closed.

14. In combination, a track, a plurality of members traveling on the track, means for transferring said members from one portion of the track to another portion thereof, means comprising an electric motor for driving the transfer means, said transfer means having projections for engaging said members and the latter being movable along said one portion of the track into predetermined position for engagement by said projections, a switch actuated by the transfer means and intermittently closed and opened in the operation thereof, a second switch actuated by said members and intermittently closed and opened in the travel thereof on said one portion of the track, said switches being operated in opposite relation in the normal travel of the members and said second switch remaining closed when one of said members is out of said predetermined position and in the path of travel of the projections of the transfer means, and means for opening the motor circuit when both of said switches are closed.

RAYMOND C. MAGEE.